(12) United States Patent
Finkelstein

(10) Patent No.: US 10,749,551 B1
(45) Date of Patent: Aug. 18, 2020

(54) SYSTEMS AND METHODS FOR EXTENDED SPECTRUM AMPLIFIERS

(71) Applicant: Cox Communications, Inc., Atlanta, GA (US)

(72) Inventor: Jeffrey L. Finkelstein, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 0 days.

(21) Appl. No.: 16/427,496

(22) Filed: May 31, 2019

(51) Int. Cl.
*H04B 1/40* (2015.01)
*H04H 60/09* (2008.01)
*H04B 1/00* (2006.01)
*H04B 1/405* (2015.01)
*H04J 1/08* (2006.01)
*H04B 1/04* (2006.01)

(52) U.S. Cl.
CPC .......... *H04B 1/0057* (2013.01); *H04B 1/04* (2013.01); *H04B 1/405* (2013.01); *H04J 1/08* (2013.01); *H04B 2001/0408* (2013.01)

(58) Field of Classification Search
CPC ..... H04W 8/186; H04W 24/02; H04W 40/22; H04W 84/047; H04W 88/04; H04W 88/16; H04B 7/15507; H04B 7/15528; H04B 10/40; H04B 10/697; H04B 10/25752

USPC .................................. 455/11.1, 12.1, 14, 20
See application file for complete search history.

(56) References Cited

U.S. PATENT DOCUMENTS

| 5,574,966 | A | * | 11/1996 | Barzegar | ................ | H04H 20/46 |
| | | | | | | 455/507 |
| 8,861,960 | B2 | * | 10/2014 | Grigoryan | .......... | H04B 10/2572 |
| | | | | | | 370/201 |
| 9,461,744 | B2 | * | 10/2016 | Bowler | ............ | H04B 10/25751 |
| 10,312,999 | B2 | * | 6/2019 | Neuman | ............ | H04B 7/18515 |
| 10,404,403 | B2 | * | 9/2019 | Troeltzsch | .......... | H04J 14/0208 |
| 10,505,633 | B2 | * | 12/2019 | Goodwill | .......... | H04B 10/25752 |
| 2019/0349950 | A1 | * | 11/2019 | Takano | ................ | H04W 72/085 |

* cited by examiner

*Primary Examiner* — Quochien B Vuong
(74) *Attorney, Agent, or Firm* — Eversheds Sutherland (US) LLP

(57) ABSTRACT

In various embodiments, the disclosed systems, methods, and apparatuses describe extended spectrum amplifiers. In particular, a method is described including: receiving, at an input port, a radio frequency (RF) signal on a frequency band; separating, using a demultiplexer coupled to the input port, the RF signal into four signal on four respective lines, the four signals having different frequency bands; combining, using a multiplexer coupled to the demultiplexer by the four lines, the four signals into an amplified RF signal; and amplifying, using an amplifier on each of the four lines, the respective four signals.

20 Claims, 7 Drawing Sheets

1000

1002
Receive, at an input port, a radio frequency (RF) signal on a frequency band 1004
Separate, using a demultiplexer coupled to the input port, the RF signal into four signals on four respective lines, the four signals having different frequency bands 1006
Combine, using a multiplexer coupled to the demultiplexer by the four lines, the four signals into an amplified RF signal 1008
Amplify, using an amplifier on each of the four lines, the respective four signals

SYSTEMS AND METHODS FOR EXTENDED SPECTRUM AMPLIFIERS

BACKGROUND

Many service providers, such as cable providers and satellite providers, may connect user devices to one or more networks, such as cable networks or the Internet. A provider may provide cable or Internet access to a residence through devices such as headends which may include a computer system or database required for provisioning of content. The headend may include cable modem termination system (CMTS), which can send and receives cable modem signals on a cable network, for example, to provide Internet services to cable subscribers. Such signals may be attenuated during transmission over the cable network and may accordingly signals need to be amplified. However, as cable networks increase the bandwidth of transmissions, conventional amplifiers may not be able to efficiently amplify higher bandwidth signals. This may degrade signal quality, and thereby, negatively impact a user's experience. There is thus a strong need in the market for systems and methods that remedy such problems and challenges.

BRIEF DESCRIPTION OF THE DRAWINGS

Figure 1:
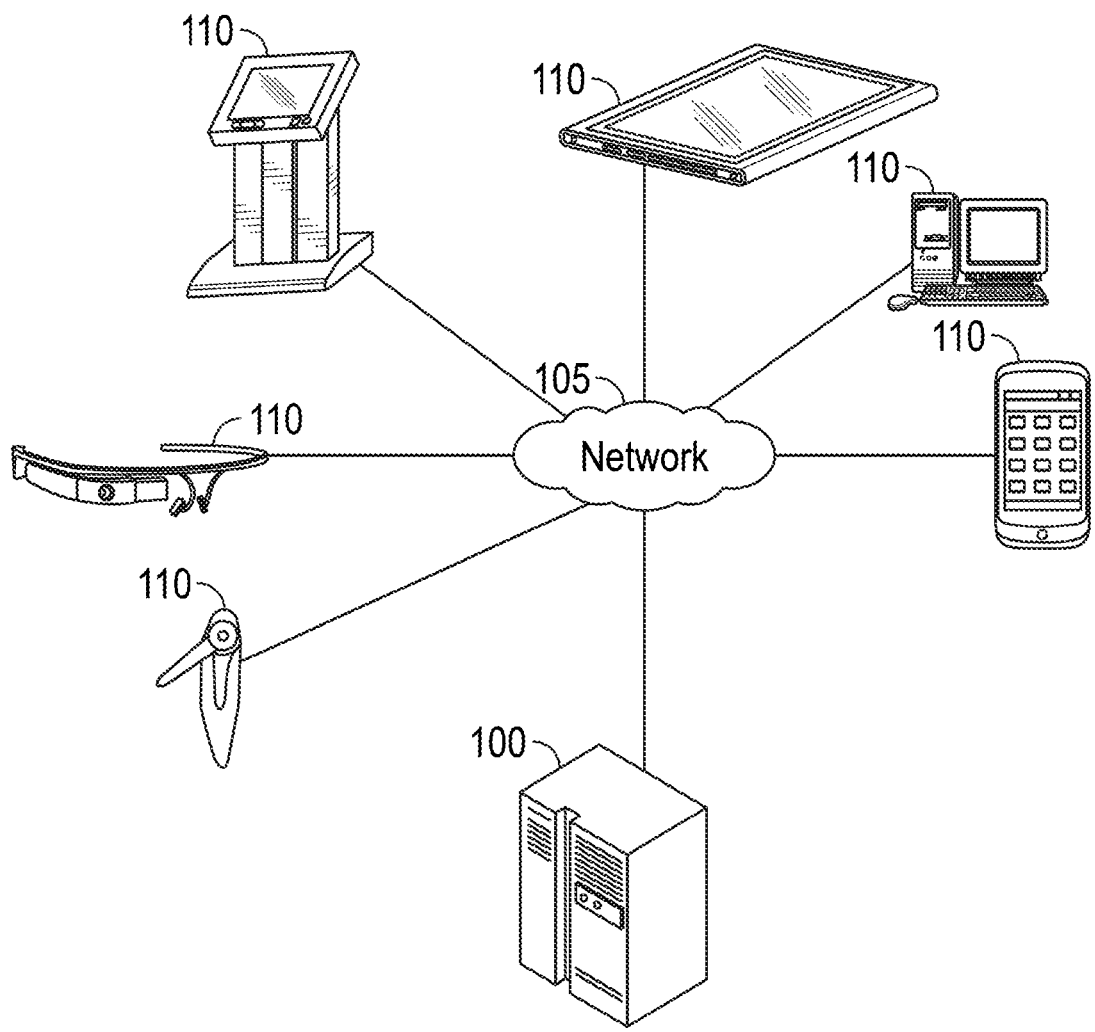
Figure 2:
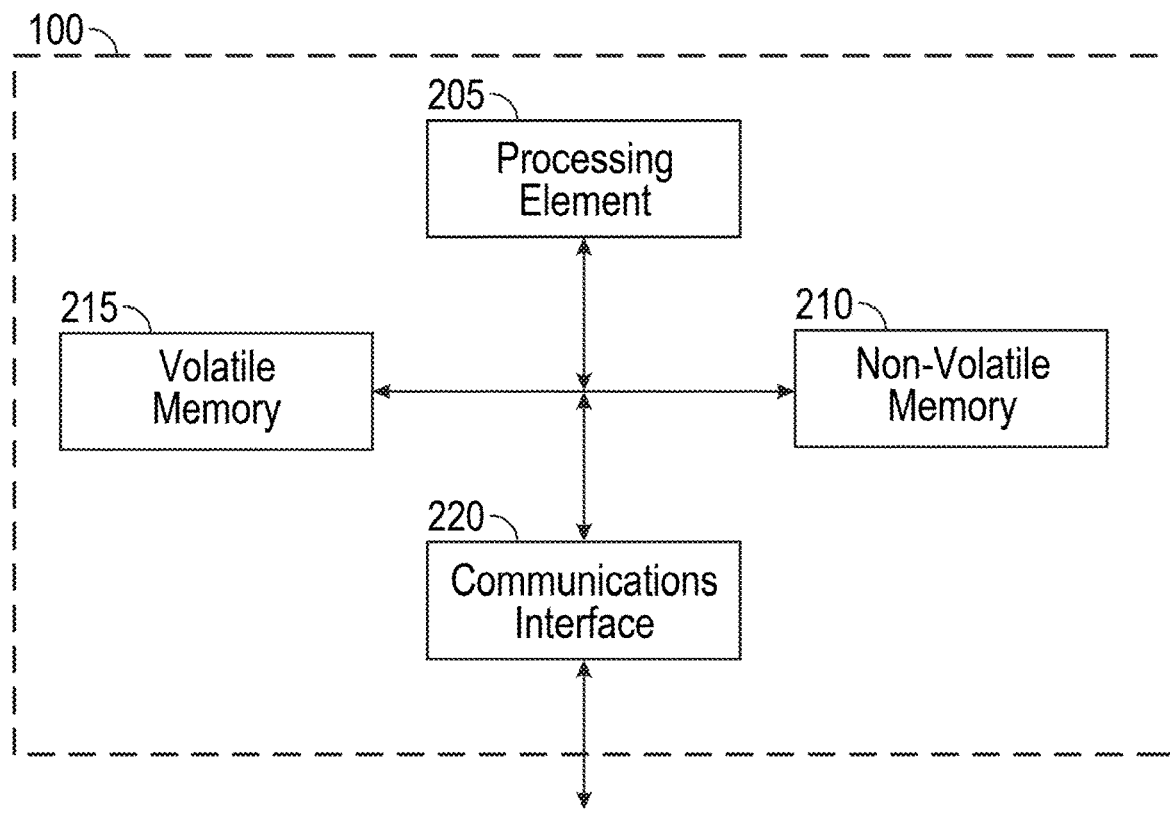
Figure 3:
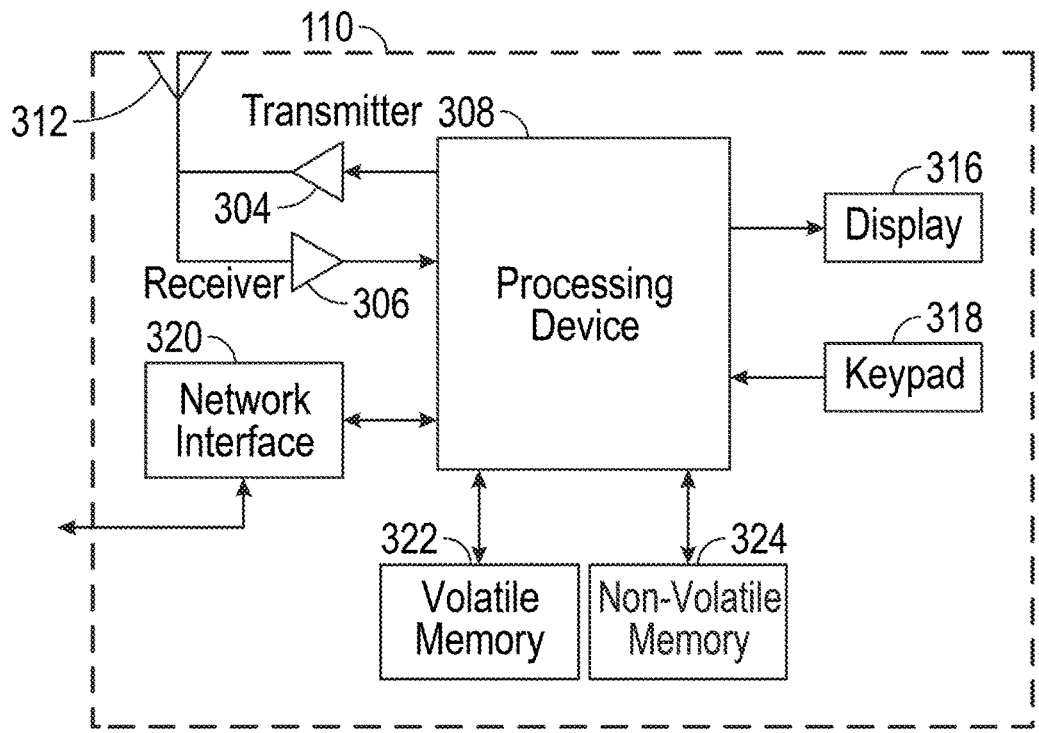
Figure 4A:
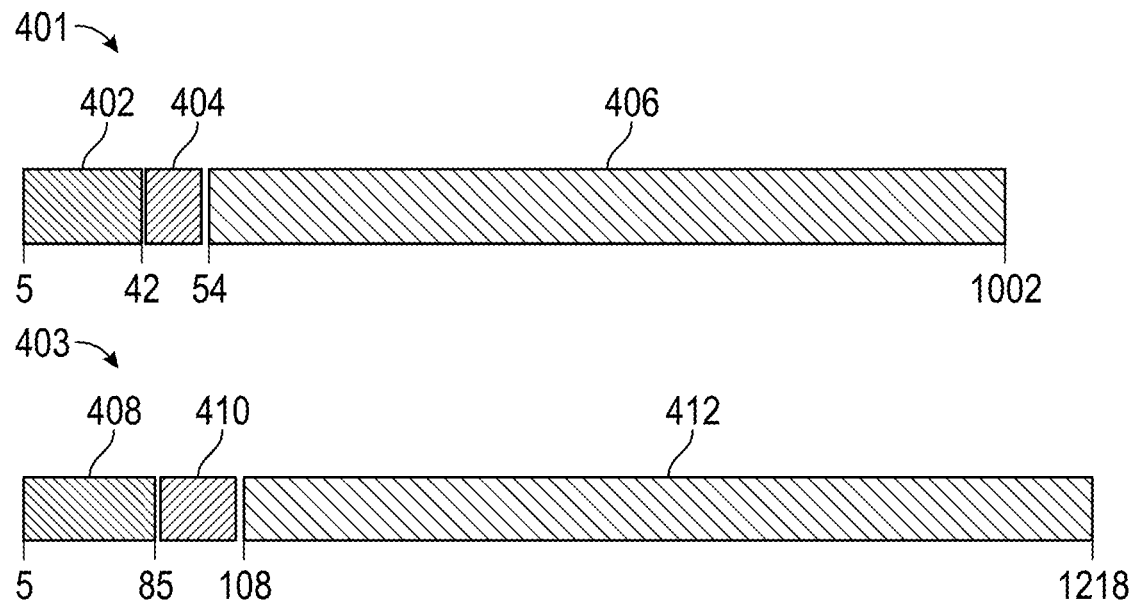
Figure 4B:
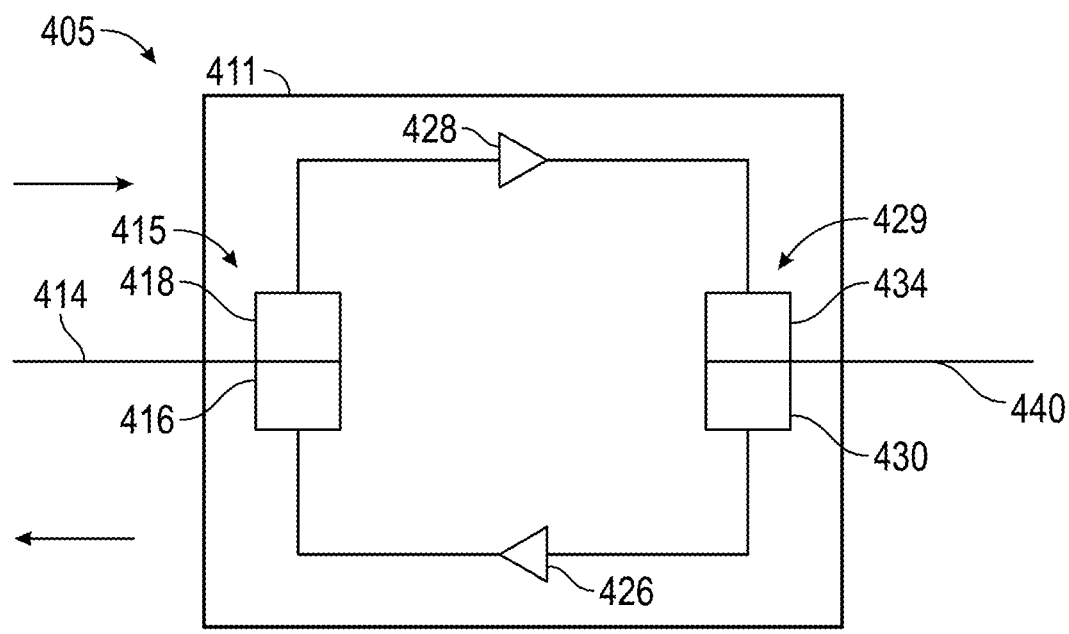

Having thus described the disclosure in general terms, reference will now be made to the accompanying drawings, which may not necessarily be drawn to scale, and wherein:

FIG. 1 is an overview of a system that can be used to practice example embodiments of the present disclosure;

FIG. 2 is an example schematic diagram of a management computing entity, in accordance with example embodiments of the disclosure;

FIG. 3 is an example schematic diagram of a user device, in accordance with example embodiments of the disclosure;

FIG. 4A is an illustration of an exemplary operational frequency spectrum for an amplifier including a two-port demultiplexer (e.g., a diplexer) used in HFC networks, in accordance with example embodiments of the disclosure;

FIG. 4B is an illustration of an exemplary amplifier including a diplexer for use in HFC networks, in accordance with example embodiments of the disclosure.

Figure 5A:
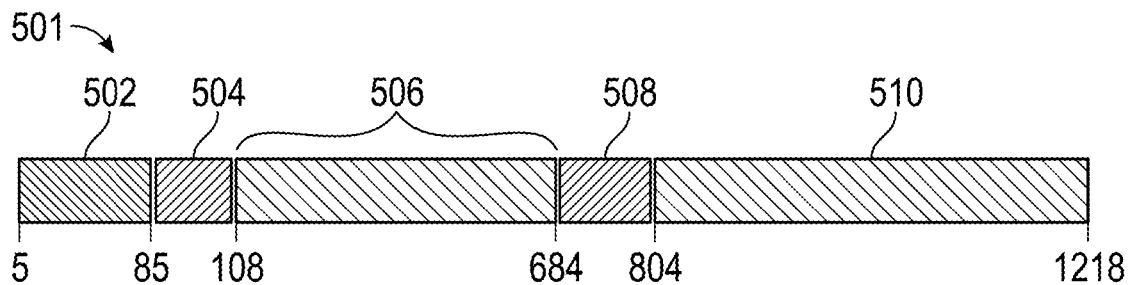
Figure 5B:
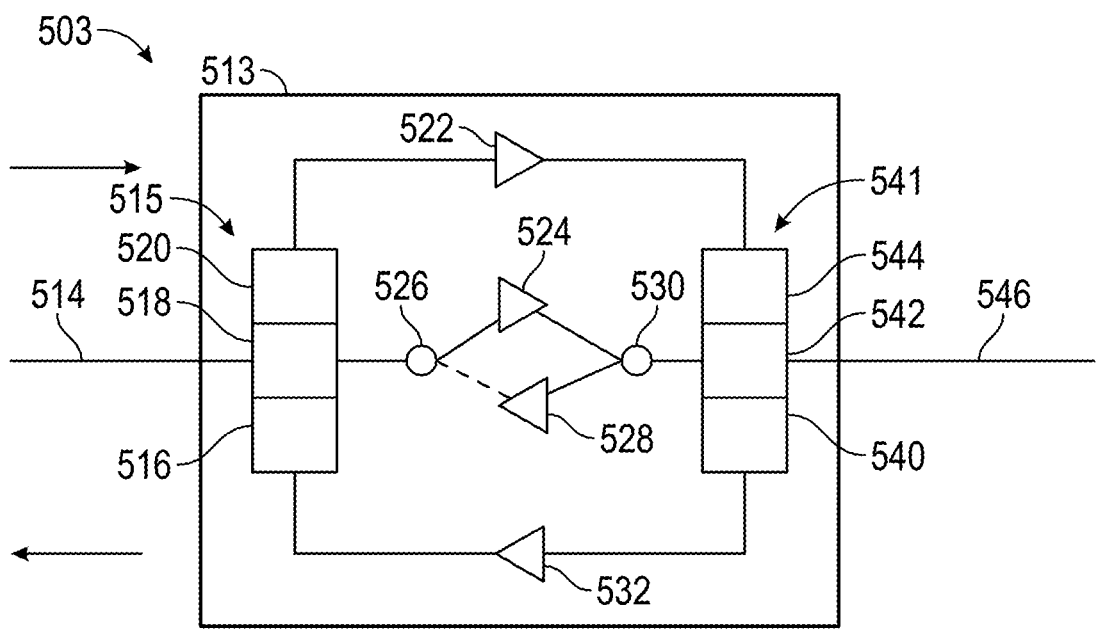
Figure 6A:
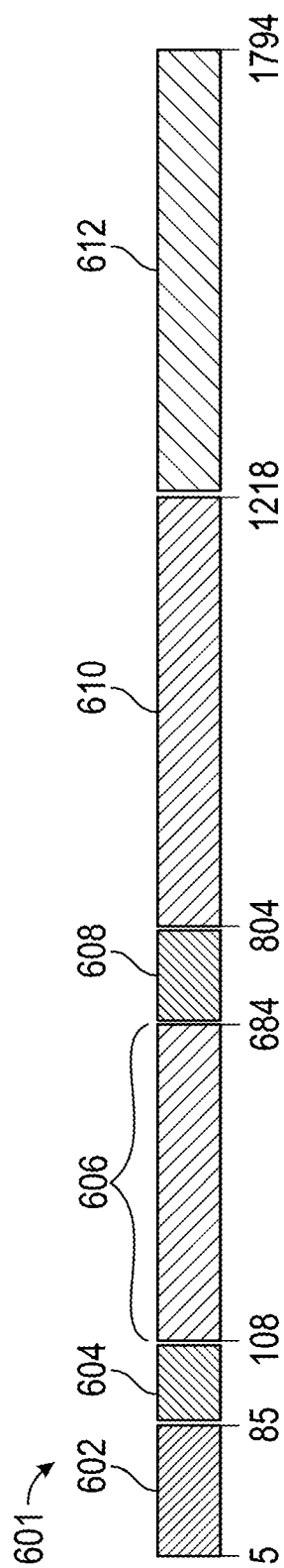
Figure 6B:
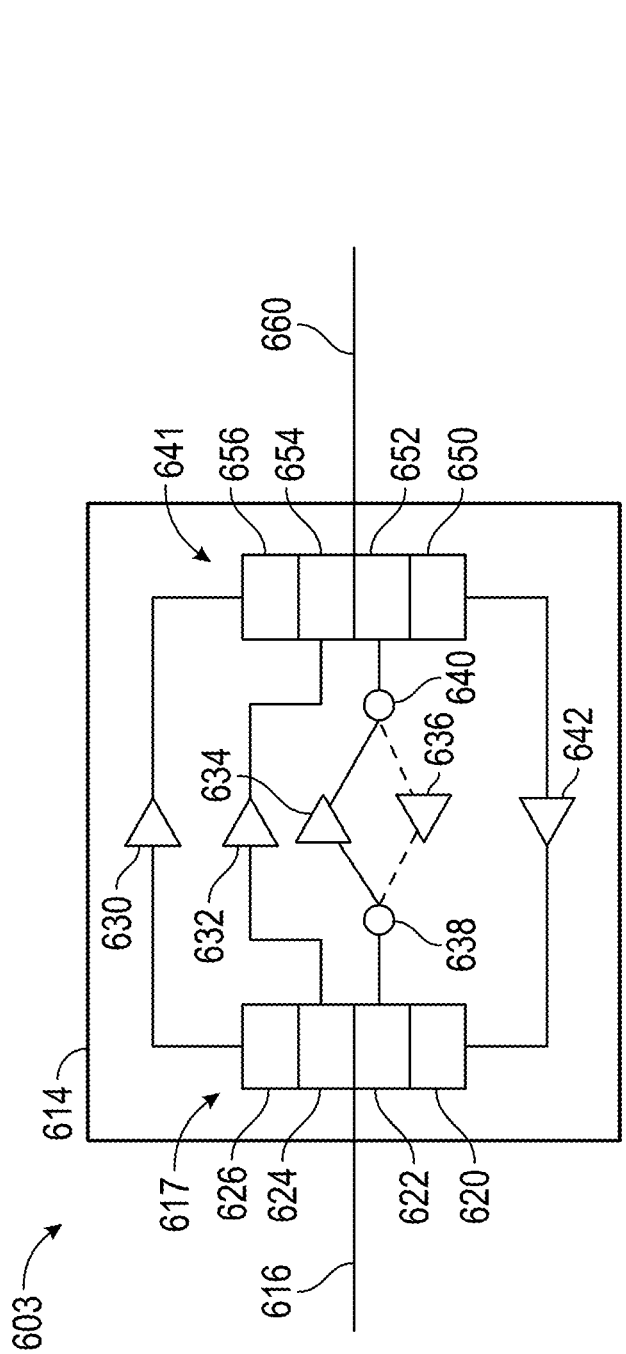
Figure 7:
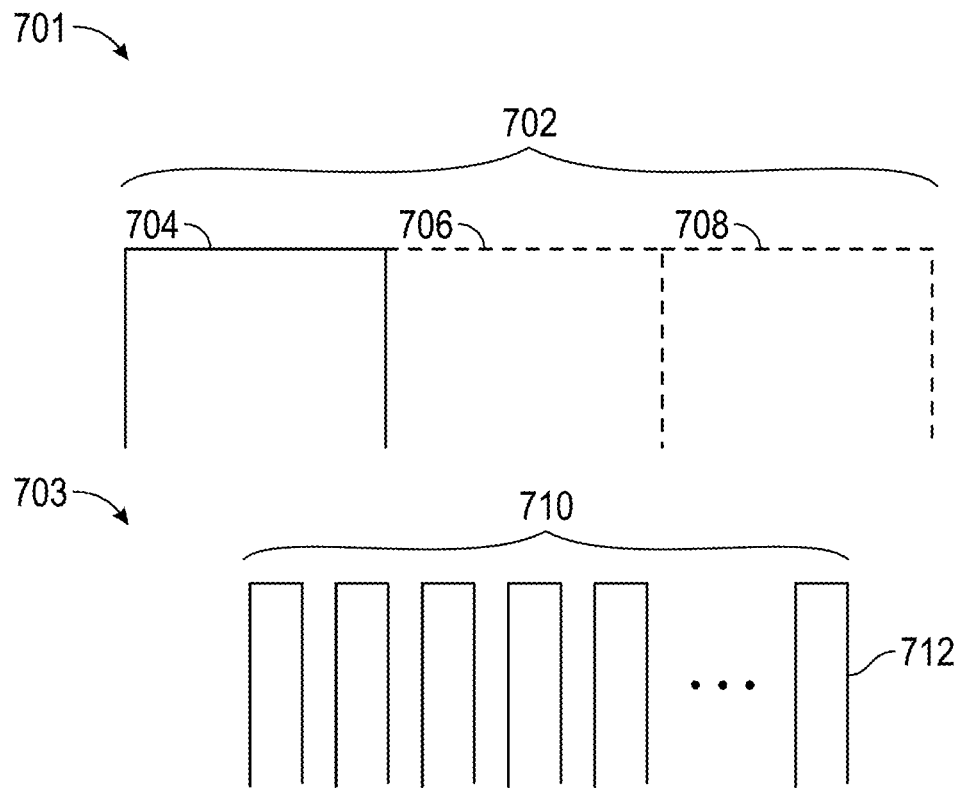
Figure 8:
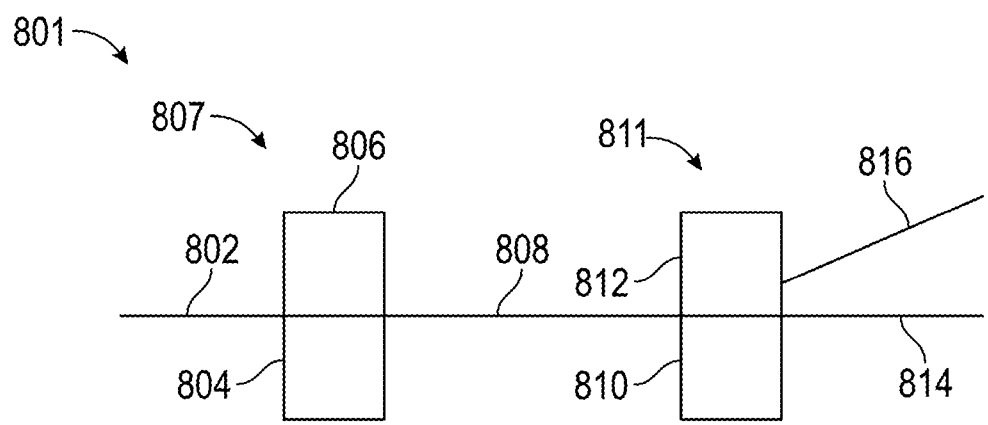
Figure 9A:
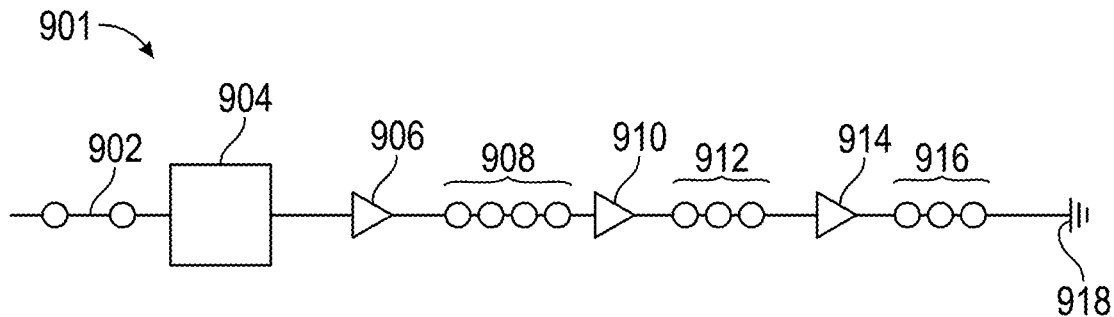
Figure 9B:
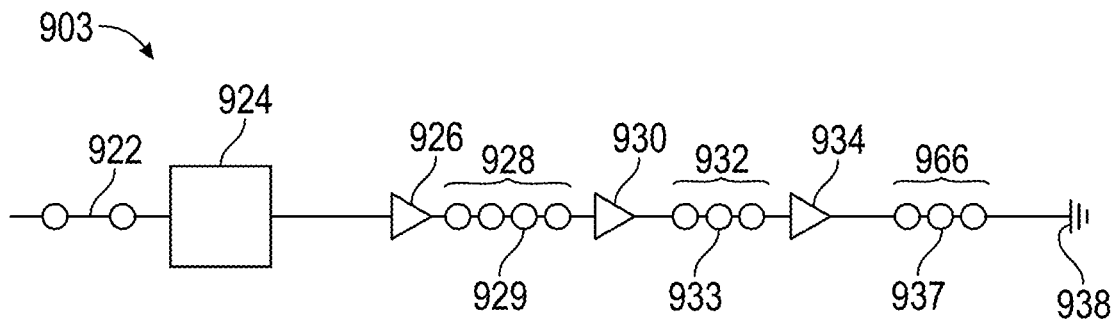
Figure 10:
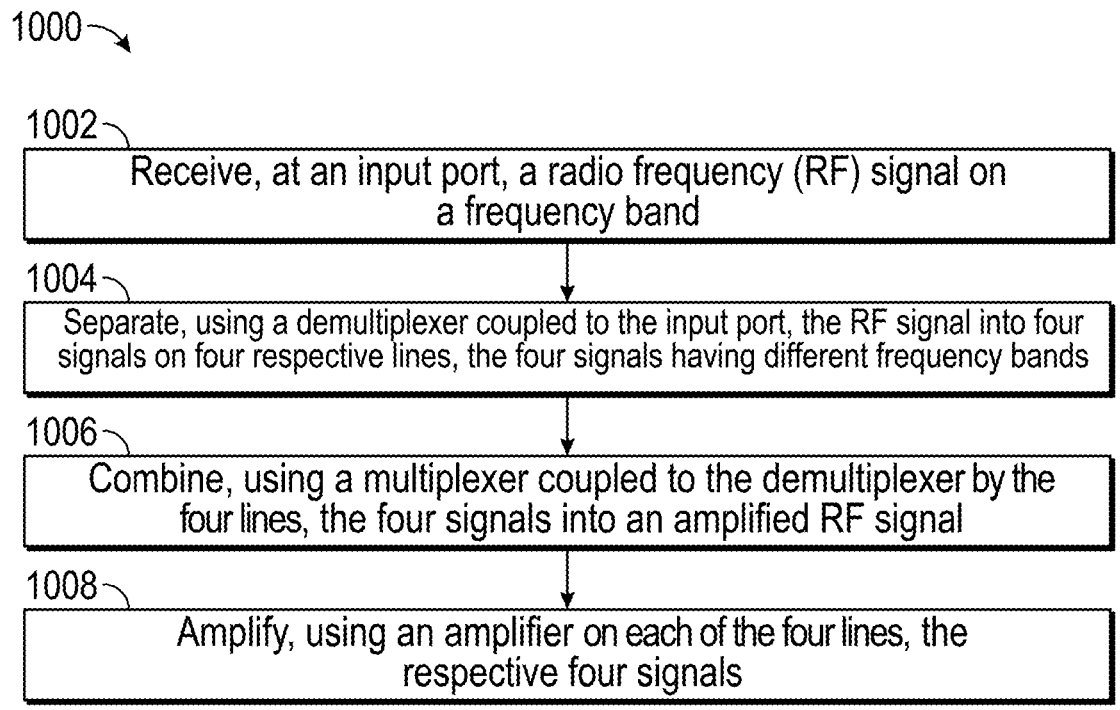

FIG. 5A is an illustration of an exemplary operational frequency spectrum for an amplifier including a three-port demultiplexer (e.g., a triplexer) used in HFC networks, in accordance with example embodiments of the disclosure;

FIG. 5B is an illustration of an exemplary amplifier including a triplexer for use in HFC networks, in accordance with example embodiments of the disclosure;

FIG. 6A is an illustration of an exemplary operational frequency spectrum for an extended spectrum amplifier in HFC networks, in accordance with example embodiments of the disclosure;

FIG. 6B is an illustration of an extended spectrum amplifier using a four-port demultiplexer (e.g., a quadplexer), in accordance with example embodiments of the disclosure;

FIG. 7 is an illustration of an exemplary quadrature amplitude modulation (QAM) and orthogonal frequency division multiplexing (OFDM) subcarriers, in accordance with example embodiments of the disclosure;

FIG. 8 is an illustration of an exemplary quadplexer device architecture for use in extended spectrum amplifiers, in accordance with example embodiments of the disclosure;

FIG. 9A is an illustration of an exemplary HFC network using conventional taps, in accordance with example embodiments of the disclosure;

FIG. 9B is an illustration of an exemplary HFC network using extended spectrum amplifiers, in accordance with example embodiments of the disclosure; and FIG. 10 is an exemplary method for amplifying RF signals on an extended spectrum on HFC networks, in accordance with example embodiments of the disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF VARIOUS EMBODIMENTS

As noted, service providers may connect user devices to one or more networks, such as cable networks. Unfortunately, users of the network may experience issues such as congestion, speed losses, pricing spikes, service interruptions, and the like that can degrade the user experience. One way to improve network throughput and/or latency is by extending the frequency range of transmission over the network. Accordingly, described herein include systems, methods, and apparatuses for extending the spectrum of amplifiers used in cable networks.

In various embodiments, a device is described. The device may include: an input port configured to receive a radio frequency (RF) signal on a frequency band; a demultiplexer coupled to the input port, the demultiplexer configured to split the RF signal into four signals, each having corresponding smaller frequency bands; a multiplexer coupled to the demultiplexer, the multiplexer configured to combine the four signals into an amplified RF signal; and amplifiers coupled to the demultiplexer and the multiplexer, the amplifiers configured to amplify the four signals.

In one embodiment, the demultiplexer may be configured to split the RF signal into four signals: a low frequency signal using a low frequency demultiplexer component, a medium frequency signal using a medium frequency demultiplexer component, a high frequency signal using a high frequency demultiplexer component, and a ultra-high frequency signal using an ultra-high frequency demultiplexer component.

The device may be further configured to transmit at least a portion of the ultra-high frequency signal at a flat power-spectral density. In some examples, the device may be further configured to transmit the amplified RF signal at a total composite power below about 30 dB.

As noted, the multiplexer may be configured to combine the four signals into the amplified RF signal. This may include the multiplexer being configured to: receive the low frequency signal using a low frequency multiplexer component, the medium frequency signal using a medium frequency multiplexer component, the high frequency signal using a high frequency multiplexer component, and the ultra-high frequency signal using an ultra-high frequency multiplexer component; and combine the low frequency signal, the medium frequency signal, the high frequency signal, and the ultra-high frequency signal.

The amplifiers may include at least a low frequency amplifier configured to amplify the low frequency signal, at least two medium frequency amplifiers configured to amplify the medium frequency signal, a high frequency amplifier configured to amplify the high frequency signal, and an ultra-high frequency amplifier configured to amplify the ultra-high frequency signal.

Moreover, the device's demultiplexer may include: a first diplexer coupled to the input port and configured to split the RF signal into a first low frequency signal using a first low frequency diplexer component, and into a first high frequency signal using a first high frequency diplexer component; and a second diplexer coupled to the first high frequency diplexer component, and configured to split the first high frequency signal into a second high frequency signal and a third high frequency signal using a second high frequency component and a third high frequency component, respectively.

Other embodiments of this aspect include corresponding systems, apparatus, and computer programs, configured to perform the actions of the methods, encoded on computer storage devices.

Particular embodiments of the subject matter described herein can be implemented to realize one or more of the following advantages. Reduce the overall power usage of the network and/or the power usage of various devices of the network. Improve network stability and operational data transfer rates and, in turn, improve the user experience. Reduce the costs associated with routing network traffic, network maintenance, network upgrades, and/or the like.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices or portions of devices on a cable network, including, but not limited to, cable modems, optical nodes, switches, medium access control (MAC) devices, physical layer (PHY) devices, amplifiers (including the disclosed extended spectrum amplifiers, to be described further below), fiber nodes, access points (APs), and the like, variously described below. In another embodiment, such devices may include circuitry (e.g., processors and memory) and associated software instructions (e.g., computer code) to perform various functions associated with such devices (e.g., determine signals for transmission, modulate signals in accordance with one or more modulation techniques, transmit signals including packets, receive including packets, process including packets, schedule including packets, etc.). Moreover, the management computing entity 100 may perform aspects of the transmission of data over networks in accordance with various protocols and devices as described herein (e.g., at least with respect to FIGS. 4-10, below).

In another embodiment, the networks 105 may include, but not be limited to, cable networks including hybrid fiber-coaxial networks. More broadly, the networks 105 may include at least portions of wireless networks or wired networks. In another embodiment, a cable network may use various sub-networks (e.g., Wi-Fi networks, cellular networks) to perform aspects of the functionality described herein, for example, in connection with the disclosed devices (e.g., switches, MAC devices, cable modem termination system (CMTS) devices, PHY devices, amplifiers, optical fiber nodes, access points, and the like). In another embodiment, the networks 105 may use at least a portion of a fifth-generation cellular mobile communications, also referred to as 5G herein.

In another embodiment, the user devices 110 may include, but not be limited to, devices associated with a customer premise equipment (e.g., devices located in the home of a user or on the person of a user). Non-limiting examples may include, but not be limited to, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

FIG. 2 provides an illustrative schematic of a management computing entity 100 of FIG. 1, according to one embodiment of the present disclosure. As noted above, a management computing entity 100 may include various devices on a cable network, including, but not limited to, switches, MAC devices, access point devices, PHY devices, amplifiers, fiber nodes, and the like. Referring to FIG. 2, there is shown a management computing entity 100 including a processing element 205, non-volatile memory 210, volatile memory 215, and communications interface 220, to be described below.

Further, the management computing entity 100 may include a content component, a processing component, and a transmitting component (not shown). In particular, the content component may serve to determine signals indicative of data (e.g., video, audio, text, data, combinations thereof, and/or the like) to be transmitted over the network. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame that is configured to be sent from a device to one or more devices on the network.

In another embodiment, the processing component may serve to determine various parameters associated with the signal for transmission over the network. For example, the processing component may serve to determine various parameters for the signal a modulation scheme (e.g., a particular quadrature amplitude modulation (QAM) modulation, to be discussed further below), a power level (e.g., a particular orthogonal frequency division multiplexing (OFDM) and/or non-orthogonal multiple access (NOMA) power level and/or code scheme), a frequency band (e.g., an approximately 1 GHz to approximately 3 GHz frequency band or any portion thereof), header information associated with the signal, combinations thereof, and/or the like.

In one embodiment, the transmitting component (not shown) may serve to transmit the signal from one device to another device on the network. For example, the transmitting component may serve to prepare a transmitter (e.g., transmitter 304 of FIG. 3, below) to transmit the signal over the network. For example, the transmitting component may queue the signal in one or more buffers, may determine that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the signal.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (e.g., non-volatile memory 210), which may also be referred to as non-volatile storage, memory, memory storage, memory circuitry and/or similar terms used herein interchangeably. In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (e.g., volatile memory 215), which may also be referred to as volatile storage, memory, memory storage, memory circuitry and/or similar terms used herein interchangeably. In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces (e.g., communications interface 220). The one or more communication interfaces may be used for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. In some embodiments, user devices 110 may include, but not be limited to, devices associated with a customer premise equipment, as described above. In another embodiment, the user device 110 may be configured to receive data from an access point, or other similar device (e.g., at a customer premise equipment site such as a home).

In various aspects, the processing component, the transmitting component, and/or the receiving component (not shown) may be configured to operate on one or more devices (e.g., a network controller device further upstream on the network, and/or other devices further downstream on the network) may include aspects of the functionality of the management computing entity 100, as shown and described in connection with FIGS. 1-2 here. In particular, the processing component, the transmitting component, and/or the receiving component may be configured to be in communication with the one or more processing elements 205, the non-volatile memory 210, the volatile memory 215, and may include the communication interface 220 (e.g., to facilitate communication between devices, for example, with various customer premise equipment such as cable modems).

FIG. 3 provides an illustrative schematic representative of a user device 110 of FIG. 1 that can be used in conjunction with embodiments of the present disclosure. As shown in FIG. 3, a user device 110 may include a transmitter 304, a receiver 306, a processing element 308, an antenna 312, a display 316, a keypad 318, a network interface 320, volatile memory 322, and non-volatile memory 324, to be described further below.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Using these communication standards and protocols, the user device 110 can communicate with various other entities. For example, the user device 110 may use communication standards and protocols such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

As noted, service providers may connect user devices to one or more networks, such as cable networks. One way to improve network throughput and/or latency is by extending the frequency range of transmission over the network. However, as cable networks increase the bandwidth of transmissions, conventional amplifiers may not be able to efficiently amplify higher bandwidth signals. This may degrade signal quality and thereby negatively impact a user experience (e.g., users using user devices connected to the network such as user device 110, described above).

Accordingly, described herein include systems, methods, and apparatuses for extending the spectrum of signal amplification on cable networks. In particular, as an example, an extended spectrum amplifier is disclosed. The extended spectrum amplifier may include: an input port configured to receive a radio frequency (RF) signal on a frequency band; a demultiplexer coupled to the input port, the demultiplexer configured to split the RF signal into four signals, each having corresponding smaller frequency bands; a multiplexer coupled to the demultiplexer, the multiplexer configured to combine the four signals into an amplified RF signal; and amplifiers coupled to the demultiplexer and the multiplexer, the amplifiers configured to amplify the four signals. These components and their various connections and capabilities will be discussed further below, The disclosed extended spectrum amplifiers may have various advantages over conventional amplifiers used in connection with cable networks. In particular, using conventional amplifiers on networks having an extended spectral range (e.g., above about 1.2 gigahertz, GHz) may require amplifiers to provide additional power. In particular, such conventional amplifiers may require up to about 30 dB of gain over higher frequency ranges to account for losses at those frequencies. However, by using the extended spectrum amplifiers described herein, the disclosed systems may transmit using a flatter power spectral density (PSD) at higher frequencies. Accordingly, extended spectrum amplifiers described herein may transmit with sufficient gain to overcome about 17 dB of loss.

In various embodiments, various components and signal characteristics may influence the communications over a network, such as a hybrid fiber-coaxial (HFC) network that combines optical fiber and coaxial cable. Some of these components and signal characteristics may include the type and length of cable used, the number of splitters, the type of taps, the number of amplifiers, the quality of the signal. In various aspects, conventional HFC networks may generally operate on a spectrum less than or equal to approximately 1.2 GHz. In particular, for communication greater than about 1.2 GHz, one or more network taps of the HFC network may need to be passive (e.g., not have any active components such as amplifiers). However, the deployment of such network taps may be limited in geographical extent (e.g., about 1000 feet). In various aspects, embodiments of the disclosure devices may enable network communication up to approximately 3 GHz or higher.

In various embodiments, for some (e.g., legacy) HFC networks, as a signal is pushed further downstream on the network through various amplifiers, the quality of the signal may be impacted (e.g., degraded). In another embodiment, the signal may need to be amplified, and various distortions to the signal may need to be corrected.

In various aspects, embodiments of the disclosure are directed to extended spectrum amplifiers that may be configured to work with networks operating at greater than about 1.2 GHz, while maintaining compatibility with transmissions below about 1.2 GHz. In another embodiment, portions of signals transmitted over such a network may be configured to have a relatively flat PSD over the frequency range of operation (e.g., at or above about 1.2 GHz). In another embodiment, the extended spectrum amplifiers may be configured to operate with devices employing orthogonal frequency division multiplexing (OFDM) techniques to modulate the signals transmitted over the network.

In another embodiment, components of the signals transmitted over the network at various frequencies (e.g., including over 1.2 GHz) may be linearized using any suitable technique, for example, using various signal processing techniques. In another embodiment, the signal may be linearized by using a given modulation technique such as OFDM and/or orthogonal frequency-division multiple access (OFDMA). In another embodiment, for duplex communication over the network, the network may operate in accordance with a given modulation technique such as non-orthogonal multiple access (NOMA). In particular, at least some frequency components of signals transmitted between devices on the network may be transmitted using a NOMA technique.

FIG. 4A is an illustration of an exemplary operational frequency spectrum for an amplifier including a diplexer used in HFC networks, in accordance with example embodiments of the disclosure. In particular, such a conventional amplifier including a diplexer may be configured to operate with lower frequency transmissions, as described further below.

In various embodiments, diagram 401 includes a horizontal scale representing frequency in units of megahertz (MHz). The diagram shows a low frequency band 402, a diplexer rolloff band 404, a high frequency band 406. In one embodiment, the low frequency band 402 may span a frequency band from about 5 MHz to about 42 MHz. Further, the low frequency band 402 may be used for upstream communications on the HFC network. In another embodiment, a diplexer rolloff band 404 may span a frequency band from about 42 MHz to about 54 MHz. The diplex rolloff band 404 may represent an unusable portion of the frequency band of the amplifier (e.g., amplifier shown and described in connection with FIG. 4B, below). In one embodiment, a high frequency band 406 may span a frequency band from about 54 MHz to about 1 GHz. Further, the high frequency band 406 may be used for downstream communications on the HFC network.

In various embodiments, diagram 403 shows a low frequency band 408, a diplexer rolloff band 410, and a high frequency band 412. In one embodiment, the low frequency band 408 may span a frequency band from about 5 MHz to about 85 MHz. Further, the low frequency band 402 may be used for upstream communications on the HFC network. In another embodiment, a diplexer rolloff band 410 may span a frequency band from about 85 MHz to about 108 MHz. The diplex rolloff band 410 may represent an unusable portion of the frequency band of a corresponding amplifier (e.g., amplifier shown and described in connection with FIG. 4B, below). In another embodiment, a high frequency band 412 may span a frequency band from about 108 MHz to about 1.2 GHz. Further, the high frequency band 412 may be used for downstream communications on the HFC network.

FIG. 4B is an illustration of an exemplary amplifier including a diplexer for use in HFC networks, in accordance with example embodiments of the disclosure. In various embodiments, diagram 405 shows amplifier 411, input port 414, two-port demultiplexer 415, low frequency demultiplexer component 416, high frequency demultiplexer component 418, low frequency amplifier 426, high frequency amplifier 428, two-port multiplexer 429, low frequency multiplexer component 430, high frequency multiplexer component 434, and an output port 440.

In various embodiments, the amplifier 411 may receive, at the input port 414, an RF signal on a frequency band spanning from about 5 MHz to about 1 GHz or 1.2 GHz, as shown in diagrams 401 and 403, above. Further, the amplifier 411 may separate, using the two-port demultiplexer 415 (e.g., a diplexer) coupled to the input port, the RF signal into two signals, each having corresponding smaller frequency bands. The amplifier 411 may amplify, using amplifiers (e.g., low frequency amplifier 426 and high frequency amplifier 428) coupled to the two-port demultiplexer 415, the two signals. Finally, the amplifier 411 may combine, using a two-port multiplexer 429, the two signals into an amplified RF signal that may be transmitted at the output port 440 to another device on the network.

In some embodiments, the amplifier 411 may operate on signals that are directional (e.g., signals that are transmitted between a device such as a headend to a customer device). In particular, in the notation of FIG. 4B, a signal received at the input port 414 and outputted on the output port 440 is considered a downstream transmission, while a signal received at the output port 440 and outputted on the input port 414 is considered an upstream transmission.

In various embodiments, the two-port demultiplexer 415 may include a low frequency demultiplexer component 416 which may be configured to separate the RF signal at the input port 414 to a low frequency signal. The two-port demultiplexer 415 may include a high frequency demultiplexer component 418 which may be configured to separate the RF signal at the input port 414 to a high frequency signal.

In another embodiment, the low frequency amplifier 426 may be configured to amplify the low frequency signal, and the high frequency amplifier 428 may be configured to amplify the high frequency signal. Further, the amplifiers may include variable gain amplifiers, which may have a configurable gain that may be modified with a potentiometer, a pushpin, or similar device.

In various embodiments, the two-port multiplexer 429 may include a low frequency multiplexer component 430 and a high frequency multiplexer component 434 which may both be configured to combine the amplified RF signal for transmission at the output port 440. Accordingly, the amplifier depicted in FIG. 4B including the diplexer may be used to amplify RF signals transmitted in HFC networks over the range of frequencies depicted in FIG. 4A including high frequency bands 406 and 412. This allows for signals between devices to be efficiently transmitted on the HFC network using such frequency bands.

FIG. 5A is an illustration of an exemplary operational frequency spectrum for an amplifier including a triplexer used in HFC networks, in accordance with example embodiments of the disclosure. In particular, such an amplifier including a triplexer may be configured to operate with lower frequency transmissions, as described further below.

As will be described further below, the disclosed systems may be configured to use the medium frequency band 506 for full-duplex transmissions. Accordingly, the diplexer shown and described in connection with FIG. 4B above is unable to split the input signal to the amplifier to low, medium, and high frequency bands and is therefore unable to adequately amplify signals transmitted in accordance with a full-duplex frequency bands, while the triplexer is able to do so. As used herein, full duplex may refer to data transmissions where data can be transmitted in both directions (upstream and downstream) on a signal at the same time.

In various embodiments, diagram 501 includes a horizontal scale representing frequency in units of MHz. Further, diagram 501 shows a low frequency band 502, a diplexer rolloff band 504, a medium frequency band 506, another diplexer rolloff band 508, and a high frequency band 510.

In one embodiment, the low frequency band 502 may span a frequency band from about 5 MHz to about 85 MHz. Further, the low frequency band 502 may be used for upstream communications on the HFC network. In another embodiment, the diplexer rolloff band 504 may span a frequency band from about 85 MHz to about 108 MHz. The diplex rolloff band 504 may represent an unusable portion of the frequency band of a corresponding amplifier (e.g., amplifier shown and described in connection with FIG. 5B, below). In one embodiment, the medium frequency band 506 may span a frequency band from about 108 MHz to about 684 MHz. Further, the medium frequency band 506 may be used for upstream and downstream full-duplex communications on the HFC network. In some embodiments, the other diplexer rolloff band 508 may span a frequency band from about 684 MHz to about 804 MHz and may represent another unusable portion of the frequency band of the amplifier. In another embodiment, the high frequency band 510 may span a frequency band from about 804 MHz to about 1.2 GHz. Further, the high frequency band 510 may be used for downstream communications on the HFC network.

FIG. 5B is an illustration of an exemplary amplifier including a triplexer for use in HFC networks, in accordance with example embodiments of the disclosure. In various embodiments, diagram 503 shows amplifier 513, input port 514, three-port demultiplexer 515, low frequency demultiplexer component 516, medium frequency demultiplexer component 518, high frequency demultiplexer component 520, high frequency amplifier 522, downstream medium frequency amplifier 524, upstream medium frequency amplifier 528, downstream switch 526, upstream switch 530, low frequency amplifier 532, three-port multiplexer 541, low frequency multiplexer component 540, medium frequency multiplexer component 542, high frequency multiplexer component 544, and output port 546.

In various embodiments, the amplifier 513 be similar to amplifier 411 shown and described in connection with FIG. 2, above, except that amplifier 513 may separate the RF signal received at the input port 514 into three signals, which are then amplified and combined at the output port 546. In particular, the amplifier 513 may be configured receive an RF signal on a frequency band spanning from about 5 MHz to about 1.2 GHz. Further, the amplifier 513 may separate, using the three-port demultiplexer 515 (e.g., a triplexer) coupled to the input port 514, the RF signal into three signals, each having corresponding smaller frequency bands. The amplifier 513 may amplify, using amplifiers (e.g., high frequency amplifier 522, downstream medium frequency amplifier 524, upstream medium frequency amplifier 528, and low frequency amplifier 532) coupled to the three-port demultiplexer 515, the three signals. Finally, the amplifier 513 may combine, using a three-port multiplexer 541, the three signals into an amplified RF signal that may be transmitted at the output port 546 to another device on the network.

Similar to the amplifier 411 of FIG. 4B, above, the amplifier 513 may operate on signals that are directional (e.g., signals that are transmitted between a device such as a headend to a customer device). In particular, in the notation of FIG. 5B, a signal received at the input port 514 and outputted on the output port 546 is considered a downstream transmission, while a signal received at the output port 546 and outputted on the input port 414 is considered an upstream transmission.

In various embodiments, the three-port demultiplexer 515 may include a low frequency demultiplexer component 516 which may be configured to separate the RF signal at the input port 514 to a low frequency signal. The three-port demultiplexer 515 may include a medium frequency demultiplexer component 518 which may be configured to separate the RF signal at the input port 514 to a medium frequency signal. The three-port demultiplexer 515 may include a high frequency demultiplexer component 520 which may be configured to separate the RF signal at the input port 514 to a high frequency signal.

In another embodiment, high frequency amplifier 522 may be configured to amplify the high frequency signal, the downstream medium frequency amplifier 524 and the upstream medium frequency amplifier 528 may be configured to amplify the medium frequency signal, and the low frequency amplifier 532 may be configured to amplify the low frequency signal. Moreover, switches may be used to transmit the upstream or downstream transmissions at medium frequency ranges. In particular, downstream switch 526 may be used to activate the downstream medium frequency amplifier 524, and the upstream switch 530 may be used to activate the upstream medium frequency amplifier 528. Further, the amplifiers may include variable gain amplifiers, which may have a configurable gain that may be modified with a potentiometer, a pushpin, or similar device.

In various embodiments, the three-port multiplexer 541 may include a low frequency multiplexer component 540, a medium frequency multiplexer component 542, and a high frequency multiplexer component 544 which may be configured to combine the low frequency signal, the medium frequency signal, and the high frequency signal, respectively into an amplified RF signal at the output port 546. In particular, the amplifier depicted in FIG. 5B including the triplexer may be used to amplify RF signals transmitted in HFC networks over the range of frequencies depicted in FIG. 5A including the medium frequency band 506 and the high frequency band 510. This allows for signals between devices to be efficiently transmitted in an HFC network using such full-duplex frequency bands.

FIG. 6A is an illustration of an exemplary operational frequency spectrum for an extended spectrum amplifier in HFC networks, in accordance with example embodiments of the disclosure. In various embodiments, diagram 601 includes a horizontal scale representing frequency in units of MHz. In particular, diagram 601 shows a low frequency band 602 upstream, a diplexer rolloff band 604, a medium frequency band 606, another diplexer rolloff band 608, a high frequency band 610, and an ultra-high frequency band 612. In one embodiment, the low frequency band 602 may span a frequency band from about 5 MHz to about 85 MHz. Further, the low frequency band 602 may be used for upstream communications on the HFC network. In another embodiment, the diplexer rolloff band 604 may span a frequency band from about 85 MHz to about 108 MHz. The diplex rolloff band 604 may represent an unusable portion of the frequency band of a corresponding amplifier (e.g., extended spectrum amplifier shown and described in connection with FIG. 6B, below). In one embodiment, the medium frequency band 606 may span a frequency band from about 108 MHz to about 684 MHz. Further, the medium frequency band 606 may be used for upstream and downstream full-duplex communications on the HFC network. In some embodiments, the other diplexer rolloff band 608 may span a frequency band from about 684 MHz to about 804 MHz and may represent another unusable portion of the frequency band of the amplifier. In another embodiment, the high frequency band 610 may span a frequency band from about 804 MHz to about 1.2 GHz. Further, the high frequency band 610 may be used for downstream communications on the HFC network. In another embodiment, the ultra-high frequency band 612 may span a frequency band from about 1.2 GHz to about 1.8 GHz. Further, the ultra-high frequency band 612 may be used for extended-spectrum downstream communications on the HFC network. In particular, the extended-spectrum downstream communications may be transmitted in accordance with a non-orthogonal multiple access (NOMA) technique, to be described further below.

FIG. 6B is an illustration of an extended spectrum amplifier using a four-port demultiplexer (e.g., a quadplexer), in accordance with example embodiments of the disclosure. In particular, diagram 603 includes extended spectrum amplifier 614, input port 616, four-port demultiplexer 617, low frequency demultiplexer component 620, medium frequency demultiplexer component 622, high frequency demultiplexer component 624, ultra-high frequency demultiplexer component 626, ultra-high frequency amplifier 630, high frequency amplifier 632, downstream medium frequency amplifier 634, upstream medium frequency amplifier 636, downstream switch 638, upstream switch 640, low frequency amplifier 642, four-port multiplexer 641, the four-port multiplexer including a low frequency multiplexer component 650, medium frequency multiplexer component 652, high frequency multiplexer component 654, ultra-high frequency multiplexer component 656, and output port 660.

In various embodiments, the extended spectrum amplifier 614 may be similar to amplifier 513 shown and described in connection with FIG. 5B, above, except that extended spectrum amplifier 614 may separate the RF signal received at the input port 616 into four signals, which are then amplified and combined at the output port 660. In particular, the extended spectrum amplifier 614 may be configured to receive an RF signal on a frequency band spanning from about 5 MHz to about 1.8 GHz or 3 GHz. Further, the extended spectrum amplifier 614 may separate, using the four-port demultiplexer 617 coupled to the input port 616, the RF signal into four signals, each having corresponding smaller frequency bands. The extended spectrum amplifier 614 may amplify, using amplifiers (e.g., ultra-high frequency amplifier 630, high frequency amplifier 632, downstream medium frequency amplifier 634, upstream medium frequency amplifier 636, and low frequency amplifier 642) coupled to the four-port demultiplexer 617, the four signals. Further, the downstream switch 638 and the upstream switch 640 may be configured to activate or deactivate the downstream medium frequency amplifier 634 and the upstream medium frequency amplifier 636, respectively. The switches may activate the respective amplifier to transmit upstream or downstream signals, depending on the data being transmitted over the HFC network. The switches may include an electronic component or device that can alter the path of electrical flow in an electrical circuit, interrupting the current or diverting it from one conductor to another. In some embodiments, a switch may include one or more sets of contacts, which may operate simultaneously, sequentially, or alternately. Finally, the extended spectrum amplifier 614 may combine, using a four-port multiplexer 641, the four signals into an amplified RF signal that may be transmitted at the output port 660 to another device on the network.

In various embodiments, the extended spectrum amplifier 614 transmit at least a portion of the ultra-high frequency signal at a flat power-spectral density. Further, the extended spectrum amplifier 614 may be configured to transmit the amplified RF signal at a total composite power below about 30 dB, as described further in connection with 7, below.

Similar to the amplifier 513 of FIG. 5B, above, the extended spectrum amplifier 614 may operate on signals that are directional (e.g., signals that are transmitted between a device such as a headend to a customer device). In particular, in the notation of FIG. 6B, a signal received at the input port 616 and outputted on the output port 660 is considered a downstream transmission, while a signal received at the output port 660 and outputted on the input port 616 is considered an upstream transmission.

In various embodiments, the four-port demultiplexer 617 may include a low frequency demultiplexer component 620 which may be configured to separate the RF signal at the input port 616 to a low frequency signal. The four-port demultiplexer 617 may include a medium frequency demultiplexer component 622 which may be configured to separate the RF signal at the input port 616 to a medium frequency signal. The four-port demultiplexer 617 may include a high frequency demultiplexer component 624 which may be configured to separate the RF signal at the input port 616 to a high frequency signal. The four-port demultiplexer 617 may include an ultra-high frequency demultiplexer component 626 which may be configured to separate the RF signal at the input port 616 to a ultra-high frequency signal.

In another embodiment, ultra-high frequency amplifier 630 may be configured to amplify the ultra-high frequency signal, the high frequency amplifier 632 may be configured to amplify the high frequency signal, the downstream medium frequency amplifier 634 and the upstream medium frequency amplifier 636 may be configured to amplify the medium frequency signal, and the low frequency amplifier 642 may be configured to amplify the low frequency signal. Moreover, upon determining that the signal transmission constitute downstream transmissions on the HFC network, the disclosed systems may send a control command to the amplifier to close a contact associated with downstream switch 638 such that the downstream switch 638 may be used to activate the downstream medium frequency amplifier 634. Further, upon determining that the signal transmission constitute upstream transmissions on the HFC network, the disclosed systems may send a control command to the amplifier to close a contact associated with upstream switch 640 such that the upstream switch 640 may be used to activate the upstream medium frequency amplifier 636. Further, the amplifiers may include variable gain amplifiers, which may have a configurable gain that may be modified with a potentiometer, a pushpin, or similar device.

In various embodiments, the four-port multiplexer 641 may include a low frequency multiplexer component 650, a medium frequency multiplexer component 652, and a high frequency multiplexer component 654, and an ultra-high frequency multiplexer component 656, which may be configured to combine the low frequency signal, the medium frequency signal, and the high frequency signal, respectively into an amplified RF signal at the output port 660.

FIG. 7 is an illustration of an exemplary QAM and OFDM subcarriers, in accordance with example embodiments of the disclosure. Diagram 701 shows an exemplary portion of QAM frequency band 702 which may further include first QAM subcarrier 704, second QAM subcarrier 706, and third QAM subcarrier 708, etc. The subcarriers may have an approximately 6 MHz bandwidth. In one embodiment, a device (e.g., an extended spectrum amplifier) may transmit a signal on the exemplary portion of QAM frequency band 702 with a predetermined total composite power (TCP). Diagram 703 shows an exemplary portion of OFDM frequency band 710 which may further include numerous OFDM subcarriers. A given OFDM subcarrier may have a bandwidth of about 50 KHz. Further, there may be about 300 50 KHz OFDM subcarriers 712 for each 6 MHz QAM subcarrier.

Based at least on the difference in bandwidth and number of carriers for signals transmitted using the OFDM and QAM modulation techniques, the associated amplifiers needed to amplify the different signal may have the same total composite powers (TCPs) across similar frequency bandwidths (e.g., exemplary portion of QAM frequency band 702 or exemplary portion of OFDM frequency band 710), but may have different signal levels for the OFDM or QAM subcarriers. In particular, the signal level is lower for a signal transmitted using OFDM and spread across approximately 300 50 KHz subcarriers 712 than the signal level for a similar signal transmitted over a single 6 MHz subcarrier transmitted using QAM. Accordingly, amplifier including a quadplexer may be configured to amplify ultra-high band separately. One method to amplify the ultra-high band separately is to break out with a quadplexer as shown in connection with FIG. 6B above, or with a daisy-chain and/or stacked diplex filter architecture, as shown and described in connection with FIG. 8, below.

In some embodiments, a high frequency band 610 of FIG. 6 described above may span from about 804 MHz to about 1.2 GHz and may include downstream transmission having signals transmitted using both QAM and OFDM. Ordinarily, a device may transmit an OFDM signal at a tilt (e.g., an attenuation of lower frequency signals). In various embodiments, for signal components at frequencies less than or equal to about 1.0 GHz, an approximately 17 dB tilt may be applied. In another embodiment, for signals between about 1.0 GHz and about 1.2 GHz, an approximately 5 dB tilt may be applied in addition to a transmission of a flat PSD. In one embodiment, for signals between about 1.2 GHz and about 1.8 GHz, an approximately 7 dB tilt may be needed in addition to a transmission of a flat PSD.

However, by transmitting the signal at a tilt all the way up to the end of the frequency range, the device's power usage may become prohibitive. Accordingly, the disclosed systems may employ bitloading with the OFDM carriers to bring the signal levels down as the signal frequency increases. Bitloading may refer to the process of differentially transmitting the number of bits that can be transmitted on given subcarriers (e.g., OFDM carriers). Further, the disclosed systems may also transmit the OFDM signal with a flattened PSD (i.e., having a relatively constant received power versus frequency characteristic) such that subcarriers having a greater frequency are transmitted with lower PSD as compared with subcarriers at lower frequencies. In particular, the disclosed systems can, broadly characterized, sequence through operations of sending a signal to a receiving device, receiving a second signal from the receiving device, comparing the transmitted and received signal against internally stored tables, determining to send the signal at a different modulation and/or signal power level based on the comparison, and implementing a change in the modulation and/or power signal power level for a future signal to be sent to receiving device(s).

Accordingly, by using the extended spectrum amplifiers instead of conventional amplifiers and using bitloading, the disclosed systems may transmit signals using lower power in the upper portions of the high frequency band 610 without significantly increasing the power budget of amplifiers in the HFC network. Similarly, by only employing a tilt to a signal from 800 MHz and extending to 3 GHz (e.g., the ultra-high frequency band), a device would have to provide a prohibitive amount of power at higher frequencies (e.g., about 40 dB at 3 GHz). Similarly, the disclosed systems may transmit signals from 800 MHz and extending to 3 GHz (e.g., the ultra-high frequency band) without only employing a tilt, but rather by transmit the signal with a flattened PSD such that signal portions having a greater frequency are transmitted with lower PSD as compared with signal portions at lower frequencies. Further, the disclosed systems may transmit the signals over the using a combination of OFDM, QAM, and/or NOMA.

As noted, a NOMA technique may be used for transmitting and receiving signals including data and information in the high and/or ultra-high portions of the frequency band (e.g., generally above 1 GHz) over at least portions of the wired network, including, but not limited to, a cable network. Moreover, in one embodiment, NOMA may be used to communicate over at least portions of a wireless network (e.g., a 5G network). In various embodiments, the disclosure enables may enable higher spectral efficiency and throughput on wired networks, wireless networks, or both. In particular, as compared with orthogonal multiple access (OMA) techniques such as OFDM and OFDMA, NOMA may provide for one or more of the following advantages: increased spectral efficiency due to use of multiple users on the same frequency bands, increased connectivity by serving more uses simultaneously at the same time, lower latency due to simultaneous transmission in a given time interval rather than at dedicated scheduled time slots, and better quality of service (QoS) to users using flexible power control algorithms.

As used herein, orthogonality in the context of multiple-access schemes for communications systems, may refer to communications where an ideal receiver can reject strong unwanted signals from the desired signal using different basis functions to encode the signals. In particular, OMA schemes may use time-division multiple access (TDMA) and frequency-division multiple access (FDMA) channel access techniques. In TDMA, the data associated with a given user's device may be sent in non-overlapping time slots; accordingly, TDMA-based networks may need accurate timing synchronization, which may be challenging in data uplink. In FDMA implementations such as OFDMA, data associated with a given user's device may be assigned to a subset of subcarriers. Further, another OMA technique may include a code-division multiple access (CDMA) technique, which may involve coding the data associated with a given user's device in order to separate different users over the same channel.

In various embodiments, NOMA may be different than these multiple access schemes which provide orthogonal access to the users either in time, frequency, code or space.

In one embodiment, in NOMA, devices communicating over the network may operate in the same frequency band and/or at the same time, but the devices and their corresponding communications may be distinguished from one another by the power levels associated with those communications. In one embodiment, a NOMA technique may implement superposition coding at a transmitting device (e.g., a headend) and a receiving device (e.g., a cable modem) may implement a successive interference cancellation (SIC) technique to separate the devices and corresponding data and may do so both in the uplink and in the downlink channels.

In an embodiment, as noted, NOMA may use the power domain to separate signals having differences in their individual power level from each other for transmission over the network. At a receiving device (e.g., a cable modem), higher power level signals may be separated out and isolated from the lower power level signal. In some embodiments, NOMA may introduce non-orthogonality in a transmitted signal either in time, frequency or code, and a total signal may be generated as a superposition of multiple signals (e.g., via a superposition coding technique) at different power levels and transmitted over the medium (e.g., coaxial cable). In one embodiment, in NOMA for downlink transmission (e.g., from the headend to a cable modem), more power is allocated to devices including user equipment (UE) located farther from the transmitting device (e.g., headend) and the least power to devices including UE that are closest to the transmitting device.

In another embodiment, the multiple signals being transmitted from a transmitting device to a receiving device may be associated with different content types (e.g., video, audio, data and the like), or may be associated with signals directed to different receiving devices (e.g., a first signal directed for a first receiving device, a second signal directed to a second receiving device, and the like). Further, as the total signal is received at a receiving device, the receiving device may perform demultiplexing based on the power difference between the multiple signals. In particular, to extract a given signal from the total signal, a technique such as SIC may be used by the receiving device. In particular, using the SIC technique, the receiving device may first decode the signal in the received transmission that is the strongest one while treating other signals in the transmission as interference and/or noise. In another embodiment, the first decoded signal may then be subtracted from the received signal and, if the decoding is determined to be greater than in quality than a predetermined threshold, the residual signal (e.g., the signal including the rest of the signals) is accurately obtained. In one embodiment, the SIC technique may be iteratively applied by a receiving device until the receiving device determines the signal that was intended for it (as opposed to determining other signals in the transmission intended for other devices on the network).

In one embodiment, the SIC or other suitable algorithms for signal extraction from a NOMA signal may be based at least in part on channel properties associated with the channel over which the transmitting device and the receiving device communicate, the received signal to noise ratio (SNR) difference associated with communications between the transmitting device and the receiving device, combinations thereof, and/or the like. In another embodiment, power sharing of the individual signals in the total signal may reduce the power allocated to each receiving device; in particular, receiving devices having comparatively high channel gains and receiving devices with comparatively low channel gains may be scheduled more frequently and may be assigned more bandwidth. In particular, the receiving device may first decode a signal it decodes that the receiving device receives from the nearest transmitting user device or the user device communicating on the strongest channel. Moreover, the last signal that the receiving device decodes may be the signal for the farthest user device or the signal from the user device on the weakest channel. Accordingly, by using NOMA the network capacity, throughput, and fairness of the network transmissions may be improved for all devices of the network.

In various embodiments, uplink implementation of NOMA may implement a different procedure as compared with downlink implementation of NOMA. In the uplink, the user devices may optimize transmit powers according to the user device's device and data characteristics (e.g., power level capability, type of data to be transmitted, etc.) and corresponding channel conditions (e.g., noisy, clear, etc.). In some embodiments, the channel conditions of the receiving device may include a sensitivity of the receiving device. In another embodiment, the sensitivity of a device may refer to the minimum magnitude of input signal required to produce a specified output signal having a specified signal-to-noise ratio, or other specified criteria. Further, the receiving device (in this case, for example, a headend) may implements SIC or a similar technique. As noted, the receiving device may first decode a signal it decodes that the receiving device receives from the nearest transmitting user device or the user device communicating on the strongest channel. Moreover, the last signal that the receiving device decodes may be the signal for the farthest user device or the signal from the user device on the weakest channel.

In various embodiments, described above included various implementations of power-domain NOMA which attains multiplexing in power domain. Unlike power-domain NOMA, code-domain NOMA may achieve multiplexing in a code domain. Like the basic CDMA systems, code-domain NOMA may share the entire available resources (time/frequency) among various transmitting devices and receiving device on a network (e.g., a wired cable network). In contrast to CDMA, code-domain NOMA may use user-device specific spreading sequences that may be either sparse sequences or may include non-orthogonal cross-correlation sequences having low correlation coefficient. In various embodiments, a code domain NOMA may implement various aspects of CDMA in conjunction with the NOMA technique. for example, non-limiting examples of code-domain NOMA that may be used in connection with CDMA and with various embodiments described herein include, but may not be limited to, low-density spreading CDMA (LDS-CDMA) low-density spreading-based OFDM (LDS-OFDM), and sparse code multiple access (SCMA).

In some embodiments, various embodiments of the disclosure may use any suitable transmission technique (e.g., NOMA) in addition to a conforming to one or more rules specified by a network specification. For example, the various embodiments of the disclosure may conform with a data over cable service interface specification (DOCSIS) specification, including, but not limited to, a DOCSIS comprises at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. In particular, the DOCSIS specification may enable the deployment of data-over-cable systems on a nonproprietary, multivendor, interoperable basis for bidirectional transfer of Internet Protocol (IP) traffic between a cable system headend and customer equipment over an all-coaxial or HFC cable network. In another embodiment, HFC can refer to a broadband network that combines optical fiber and coaxial cable. In some embodiments, the system can include a CMTS or access controller node located at the headend, a coaxial or HFC medium, and cable modems located at the premises of the customer, in conjunction with DOCSIS-defined layers that support interoperability features. In some embodiments, the CMTS or access controller node can refer to a piece of equipment, for example, equipment located in a cable company's headend or hubsite, which can be used to provide data services, such as cable Internet or Voice over Internet Protocol (VoIP). In some embodiments, the CMTS or access controller node can include aspects of the functionality of the management computing entity 100, described above.

FIG. 8 is an illustration of an exemplary quadplexer device architecture for use in extended spectrum amplifiers, in accordance with example embodiments of the disclosure. In particular, diagram 801 shows input port 802, first two-port demultiplexer 807, first low frequency demultiplexer component 804, first high frequency demultiplexer component 806, connecting port 808, second two-port demultiplexer 811, second low frequency demultiplexer component 810, second high frequency demultiplexer component 812, low frequency output port 814, and high frequency output port 816.

In various embodiments, the first two-port demultiplexer 807 may receive, at the input port 802, an RF signal on a frequency band spanning from about 5 MHz to about 3 GHz. Further, the first two-port demultiplexer 807 may couple, using first high frequency demultiplexer component 806 to the input port 802, a portion of the RF signal into a second two-port demultiplexer 811 via a connecting port 808. Moreover, the second two-port demultiplexer 811 may separate, using second high frequency demultiplexer component 812, the portion of the RF signal, into a second high frequency signal spanning a frequency range of about 684 MHz to about 3 GHz and outputted on a high frequency output port 816. Additionally, the second two-port demultiplexer 811 may separate, using a second low frequency demultiplexer component 810, the portion of the RF signal, into a second low frequency signal spanning a frequency range of about 108 MHz to about 684 MHz and outputted on a low frequency output port 814.

FIG. 9A is an illustration of an exemplary HFC network using conventional taps, in accordance with example embodiments of the disclosure. Diagram 901 shows analog fiber 902, analog fiber node 904, first amplifier 906, taps 908, second amplifier 910, second taps 912, third amplifier 914, third taps 916, and electrical ground 918. Conventional HFC networks may include an analog fiber node 904 that is connected to a headend (not shown) using analog fiber 902. Further, the analog fiber node 904 may transmit signals (e.g., broadcasts) downstream, or may receive data from various user equipment devices (not shown) on an upstream channel. In various aspects, the HFC network may use various amplifiers (e.g., first amplifier 906, second amplifier 910, third amplifier 914, etc.) to amplify the transmitted signals. Further, the HFC network may use various taps (e.g., taps 908, second taps 912, third taps 916) to extract various portion of the signals for transmission to various customer premise equipment. Further, the HFC network may have an electrical ground 918 at the end of line.

FIG. 9B is an illustration of an exemplary HFC network using extended spectrum amplifiers, in accordance with example embodiments of the disclosure. In particular, diagram 903 shows digital fiber 922, distributed access device 924, extended spectrum amplifier 926 in accordance with the present disclosure, taps 928, extended spectrum amplifier with tap 929, second extended spectrum amplifier 930, second taps 932, second extended spectrum amplifier with tap 933, third extended spectrum amplifier 934, third taps 936, third extended spectrum amplifier with tap 937, and electrical ground 938.

In one embodiment, a distributed access device 924 may replace the analog fiber node 904 of FIG. 9A, above. The distributed access device 924 may include a remote medium access control (MAC) device, a remote physical layer (PHY) device, a remote MAC-PHY device, and/or the like. In another embodiment, distributed access device 924 may be configured to transmit data over the HFC network using digital fiber 922 rather than analog fiber 902. In one embodiment, the HFC network may be configured to operate using extended spectrum amplifiers such as extended spectrum amplifier 926, second extended spectrum amplifier 930, and/or third extended spectrum amplifier 934. Further, the HFC network may be configured to operate using taps such as taps 928, second taps 932, and/or third taps 936. In some examples, the taps may include amplifiers. For example, the HFC network may be configured to operate using an extended spectrum amplifier in accordance with the present disclosure with tap 929, a second extended spectrum amplifier in accordance with the present disclosure with tap 933, and/or a third extended spectrum amplifier in accordance with the present disclosure with tap 937. Further, the HFC network may have an electrical ground 938 at the end of line.

In some embodiments, the HFC network using extended spectrum amplifiers may be configured to operate on higher frequencies as compared with conventional HFC networks. Accordingly, as the frequency of transmitted signals increases, there may be additional losses on the network (e.g., on the digital fiber 922). Therefore, the amplifiers (e.g., extended spectrum amplifier 926, second extended spectrum amplifier 930, and/or third extended spectrum amplifier 934) may need to be spaced closer to one another. However, such amplifiers may be located on telephone poles or within underground vaults, which may be unmovable. Accordingly, the taps may be coupled to additional extended spectrum amplifiers (e.g., extended spectrum amplifier with tap 929, a second extended spectrum amplifier with tap 933, and/or a third extended spectrum amplifier with tap 937). In this way, the fixed distances of the existing locations for amplifiers (e.g., telephone poles or underground vault) on the HFC network are left unchanged. Further, this approach may confer additional power savings. In particular, by taking a given tap and converting it to an extended spectrum amplifier with tap capabilities, more signal amplification may be applied to signals on the network, and the total power usage may be reduced. In particular, instead of signals propagating about 300 meters to about 400 meters before amplification, with this approach, the signals are amplified every approximately 100 meters. Accordingly, HFC amplifiers such as the extended spectrum amplifier 926, second extended spectrum amplifier 930, and/or third extended spectrum amplifier 934 in accordance with the present disclosure may be able to transmit the signals less gain and therefore less power. This may confer various power savings. For example, the amplifiers may go from transmitting at about 120-140 Watt when not using regular taps. However, when using the amplifiers in addition to extended spectrum amplifiers with tap capabilities, the amplifiers may be configured to transmit in the approximately 70 to approximately 80 Watt range.

In various embodiments, a conventional tap may be upgraded to include an extended spectrum amplifier in accordance with the present disclosure and/or replaced with an extended spectrum amplifier having tap capabilities. In some examples, the amplifiers used in conventional HFC network (e.g., those described in connection with FIG. 9A, above, may use about 160 Watt, 120 Watt, and/or 100 Watt depending on their location and/or function within the HFC network. In contrast, the extended spectrum amplifiers used in connection with extended spectrum amplifier having tap capabilities may have a power usage of about 70 Watts or less.

In another embodiment, the extended spectrum amplifiers may operate using digital (as opposed to analog) electronic components. Further, the extended spectrum amplifier and associated components (e.g., two, three and/or four-port demultiplexers and/or multiplexers) may be fabricated in using digital processors and/or microstrip technologies. As noted, by implementing HFC network but to use redesigning components such the amplifiers to include extended spectrum amplifiers and redesigning taps to include taps with extended spectrum amplifiers, at various amplifiers of the HFC network may use less power (e.g., about 70-100 Watt) than in conventional HFC networks (e.g., about 120-160 Watt). Further, the distance between the extended spectrum amplifiers may be on the order of about 100 meters. The taps may be placed on the network about every 20 to 25 meters and there may be about 4-5 taps between extended spectrum amplifiers.

In various embodiments, fiber to the home networks may have associated costs at the time of this disclosure on the order of about $1000 per household passed. Further, the network throughput that may be supported may be on the order of about 10 Gbps in the best case for both downstream and upstream transmissions. For so-called "node plus zero" networks (e.g., passive coaxial networks with no amplifiers) using DOCSIS may have associated costs at the time of this disclosure on the order of about $750 per household passed. Further, such node plus zero networks may have a throughput on the order of about 8 Gbps for downstream transmissions and about 4 Gbps for upstream transmissions. For so-called "node plus x" networks (e.g., networks with an "x" number of amplimers) implementing the disclosed extended spectrum amplifiers, the associated costs at the time of this disclosure may be on the order of about $250 per household passed. Further, such node plus x networks may have a throughput on the order of about 25 Gbps for downstream transmissions and about 10 Gbps for upstream transmissions. Accordingly, such node plus x networks with extended spectrum amplifiers may offer about two and a half times the throughput for downstream communications at about a quarter of the present costs.

FIG. 10 is an exemplary method for amplifying RF signals on an extended spectrum on HFC networks, in accordance with example embodiments of the disclosure. At block 1002, the method includes receiving, at an input port, a RF signal on a frequency band. In various embodiments, the disclosed systems may operate on an HFC network. Further, the frequency band may span from about 5 MHz to about 1.8 GHz or about 3 GHz. The receiving of the RF signal may be performed at an extended spectrum amplifier, for example, an extended spectrum amplifier as shown and described in connection with FIG. 6A, above.

At block 1004, the method includes separating, using a demultiplexer coupled to the input port, the RF signal into four signals on four respective lines, the four signals having different frequency bands. In some embodiments, the demultiplexer being configured to split the RF signal into four signals may include the demultiplexer being configured to split the RF signal into a low frequency signal using a low frequency demultiplexer component, a medium frequency signal using a medium frequency demultiplexer component, a high frequency signal using a high frequency demultiplexer component, and a ultra-high frequency signal using an ultra-high frequency demultiplexer component. Such components are further shown and described in connection with FIG. 6B, above. Further, the low frequency signal may include a low frequency band of about 5 MHz to about 85 MHz, the medium frequency signal may include a medium frequency band of about 108 MHz to about 684 MHz, the high frequency signal may include a high frequency band of about 804 MHz to about 1.2 GHz, and the ultra-high frequency signal may include a ultra-high frequency band of about 1.2 GHz to about 1.8 GHz or about 3 GHz. The frequency bands are further shown and described in connection with FIG. 6A, above.

In some embodiments, the demultiplexer may include a stacked configuration (also referred to as a daisy chain configuration), as shown and described in connection with FIG. 8, above. In particular, the demultiplexer may include a first diplexer and a second diplexer. The first diplexer may be coupled to the input port and configured to split the RF signal into a first low frequency signal using a first low frequency diplexer component, and into a first high frequency signal using a first high frequency diplexer component. Further, the second diplexer may be coupled to the first high frequency diplexer component. The second diplexer may be configured to split the first high frequency signal into a second high frequency signal and a third high frequency signal using a second high frequency component and a third high frequency component, respectively. In various embodiments, the first low frequency signal may include a first low frequency band of about 5 to 85 MHz, the first high frequency signal may include a first high frequency band of about 108 to 3 GHz, the second high frequency signal may include a second high frequency band of about 108 to 684 MHz or 1.2 GHz, and the third high frequency signal may include a third high frequency band of about 684 MHz or 1.2 GHz to 3 GHz.

At block 1006, the method includes combining, using a multiplexer coupled to the demultiplexer by the four lines, the four signals into an amplified RF signal. In some embodiments, the multiplexer may include a four-port multiplexer and is shown and described in connection with FIG. 6B, above. Further, the multiplexer may receive the low frequency signal using a low frequency multiplexer component, the medium frequency signal using a medium frequency multiplexer component, the high frequency signal using a high frequency multiplexer component, and the ultra-high frequency signal using an ultra-high frequency multiplexer component. The multiplexer may then combine the low frequency signal, the medium frequency signal, the high frequency signal, and the ultra-high frequency signal, and output the combined signal on an output port.

At block 1008 the method includes amplifying, using an amplifier on each of the four lines, the respective four signals. In various embodiments, the amplifiers are further shown and described in connection with FIG. 6B, above. The amplifiers may include at least a low frequency amplifier configured to amplify the low frequency signal, at least two medium frequency amplifiers configured to amplify the medium frequency signal, a high frequency amplifier configured to amplify the high frequency signal, and an ultra-high frequency amplifier configured to amplify the ultra-high frequency signal.

Moreover, the medium frequency signal may include a state indicative of an upstream or a downstream transmission by the device. Moreover, the disclosed systems may implement a switching component coupled to the medium frequency demultiplexer component, the at least two medium frequency amplifiers, and the medium frequency multiplexer component. The switching component may be configured to selectively amplify the medium frequency signal using one of the at least two medium frequency amplifiers based on the state.

In one embodiment, the disclosed systems may be configured to transmit at least a portion of the ultra-high frequency signal at a flat power-spectral density. The disclosed systems may also be configured to transmit the amplified RF signal at a total composite power below about 30 dB.

In various aspects, as noted, the processing component, the transmitting component, and/or the receiving component (not shown) may be configured to operate on one or more devices (e.g., a network controller device further upstream on the network, and/or other devices further downstream on the network) may include aspects of the functionality of the management computing entity 100, as shown and described in connection with FIGS. 1-2, above. In particular, the processing component, the transmitting component, and/or the receiving component may be configured to be in communication with one or more processing elements 205, memory 210, volatile memory 215, and may include a communication interface 220 (e.g., to facilitate communication between devices, for example, with various customer premise equipment such as cable modems).

Moreover, the processing component, the transmitting component, and/or the receiving component (not shown) may be configured to operate on one or more devices that may be further configured to transmit data packets to customer premise equipment, which may include devices that include aspects of the functionality of the user device 110, as further shown and described in connection with FIG. 3, above. For example, customer premise equipment may include a device having a transmitter 304, a receiver 306, and/or a network interface (e.g., to communicate with an access point or other device to receive information from a fiber node or similar device). Moreover, the customer premise equipment may include a device having volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator).

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device, comprising:
an input port configured to receive a radio frequency (RF) signal on a frequency band;
a demultiplexer coupled to the input port, the demultiplexer configured to split the RF signal into signals on respective lines, the signals having different frequency bands;
a multiplexer coupled to the demultiplexer by the respective lines, the multiplexer configured to combine the signals into an amplified RF signal; and
an amplifier on each of the lines, the amplifier configured to amplify the respective signals,
wherein the demultiplexer comprises the demultiplexer being configured to split the RF signal into a low frequency signal using a low frequency demultiplexer component, a medium frequency signal using a medium frequency demultiplexer component, a high frequency signal using a high frequency demultiplexer component, and a ultra-high frequency signal using an ultra-high frequency demultiplexer component.

2. The device of claim 1, wherein the frequency band comprises about 5 MHz to about 1.8 GHz or about 3 GHz, and wherein the low frequency signal comprises a low frequency band of about 5 MHz to about 85 MHz, the medium frequency signal comprises a medium frequency band of about 108 MHz to about 684 MHz, the high frequency signal comprises a high frequency band of about 804 MHz to about 1.2 GHz, and the ultra-high frequency signal comprises a ultra-high frequency band of about 1.2 GHz to about 1.8 GHz or about 3 GHz.

3. The device of claim 1, wherein the device is further configured to transmit at least a portion of the ultra-high frequency signal at a flat power-spectral density.

4. The device of claim 1, wherein the device is further configured to transmit the amplified RF signal at a total composite power below about 30 dB.

5. The device of claim 1, wherein the multiplexer is configured to combine the signals into the amplified RF signal comprises the multiplexer being configured to:
  receive the low frequency signal using a low frequency multiplexer component, the medium frequency signal using a medium frequency multiplexer component, the high frequency signal using a high frequency multiplexer component, and the ultra-high frequency signal using an ultra-high frequency multiplexer component; and
  combine the low frequency signal, the medium frequency signal, the high frequency signal, and the ultra-high frequency signal.

6. The device of claim 1, wherein the amplifiers comprise at least a low frequency amplifier configured to amplify the low frequency signal, at least two medium frequency amplifiers configured to amplify the medium frequency signal, a high frequency amplifier configured to amplify the high frequency signal, and an ultra-high frequency amplifier configured to amplify the ultra-high frequency signal.

7. The device of claim 6, wherein the medium frequency signal comprises a state indicative of an upstream or a downstream transmission by the device, and the device further comprises a switching component coupled to the medium frequency demultiplexer component, the at least two medium frequency amplifiers, and a medium frequency multiplexer component, wherein the switching component is configured to selectively amplify the medium frequency signal using one of the at least two medium frequency amplifiers based on the state.

8. The device of claim 1, wherein the demultiplexer comprises:
  a first diplexer coupled to the input port and configured to split the RF signal into a first low frequency signal using a first low frequency diplexer component, and into a first high frequency signal using a first high frequency diplexer component; and
  a second diplexer coupled to the first high frequency diplexer component, and configured to split the first high frequency signal into a second high frequency signal and a third high frequency signal using a second high frequency component and a third high frequency component, respectively.

9. The device of claim 8, wherein the first low frequency signal comprises a first low frequency band of about 5 to 85 MHz, the first high frequency signal comprises a first high frequency band of about 108 to 3 GHz, the second high frequency signal comprises a second high frequency band of about 108 to 684 MHz or 1.2 GHz, and the third high frequency signal comprises a third high frequency band of about 684 MHz or 1.2 GHz to 3 GHz.

10. The device of claim 1, wherein the device further comprises a tap configured to transmit at least a portion of the amplified RF signal.

11. The device of claim 1, wherein the signals comprise at least four signals.

12. A system, comprising:
  a device, comprising:
    an input port configured to receive a RF signal on a frequency band;
    a demultiplexer coupled to the input port, the demultiplexer configured to split the RF signal into signals on respective lines, the signals having different frequency bands;
    a multiplexer coupled to the demultiplexer by the respective lines, the multiplexer configured to combine the signals into an amplified RF signal; and
    an amplifier on each of the lines, the amplifier configured to amplify the signals; and
    a tap configured to transmit at least a portion of the amplified RF signal,
    wherein the demultiplexer is configured to split the RF signal into a low frequency signal using a low frequency demultiplexer component, a medium frequency signal using a medium frequency demultiplexer component, a high frequency signal using a high frequency demultiplexer component, and a ultra-high frequency signal using an ultra-high frequency demultiplexer component.

13. The system of claim 12, wherein the frequency band comprises about 5 MHz to about 1.8 GHz or about 3 GHz, and wherein the low frequency signal comprises a low frequency band of about 5 MHz to about 85 MHz, the medium frequency signal comprises a medium frequency band of about 108 MHz to about 684 MHz, the high frequency signal comprises a high frequency band of about 804 MHz to about 1.2 GHz, and the ultra-high frequency signal comprises a ultra-high frequency band of about 1.2 GHz to about 1.8 GHz or about 3 GHz.

14. The system of claim 12, wherein the device is further configured to:
  transmit at least a portion of the ultra-high frequency signal at a flat power-spectral density; and
  transmit the amplified RF signal at a total composite power below about 30 dB.

15. The system of claim 12, wherein the multiplexer is configured to combine the signals into the amplified RF signal comprises the multiplexer being configured to:
  receive the low frequency signal using a low frequency multiplexer component, the medium frequency signal using a medium frequency multiplexer component, the high frequency signal using a high frequency multiplexer component, and the ultra-high frequency signal using an ultra-high frequency multiplexer component; and
  combine the low frequency signal, the medium frequency signal, the high frequency signal, and the ultra-high frequency signal.

16. The system of claim 12, wherein the amplifiers comprise at least a low frequency amplifier configured to amplify the low frequency signal, at least two medium frequency amplifiers configured to amplify the medium frequency signal, a high frequency amplifier configured to amplify the high frequency signal, and an ultra-high frequency amplifier configured to amplify the ultra-high frequency signal.

17. The system of claim 12, wherein the signals comprise at least four signals.

18. A method, comprising:
  receiving, at an input port, a radio frequency (RF) signal on a frequency band;

separating, using a demultiplexer coupled to the input port, the RF signal into signals on respective lines, the signals having different frequency bands;

combining, using a multiplexer coupled to the demultiplexer by the lines, the signals into an amplified RF signal; and amplifying, using an amplifier on each of the respective lines, the respective signals, wherein separating, using the demultiplexer coupled to the input port, the RF signal into signals comprises splitting the RF signal into a low frequency signal comprising a low frequency band of about 5 MHz to about 85 MHz, a medium frequency signal comprising a medium frequency band of about 108 MHz to about 684 MHz, a high frequency signal comprising a high frequency band of about 804 MHz to about 1.2 GHz, and a ultra-high frequency signal comprising a ultra-high frequency band of about 1.2 GHz to about 1.8 GHz or about 3 GHz.

19. The method of claim 18, further comprising:

transmitting at least a portion of the ultra-high frequency signal at a flat power-spectral density; and transmitting the amplified RF signal at a total composite power below about 30 dB.

20. The method of claim 18, wherein the signals comprise at least four signals.

* * * * *